Dec. 14, 1954 — G. M. THOMAS — 2,697,011
EMPTY AND LOAD BRAKE EQUIPMENT
Filed Nov. 16, 1951
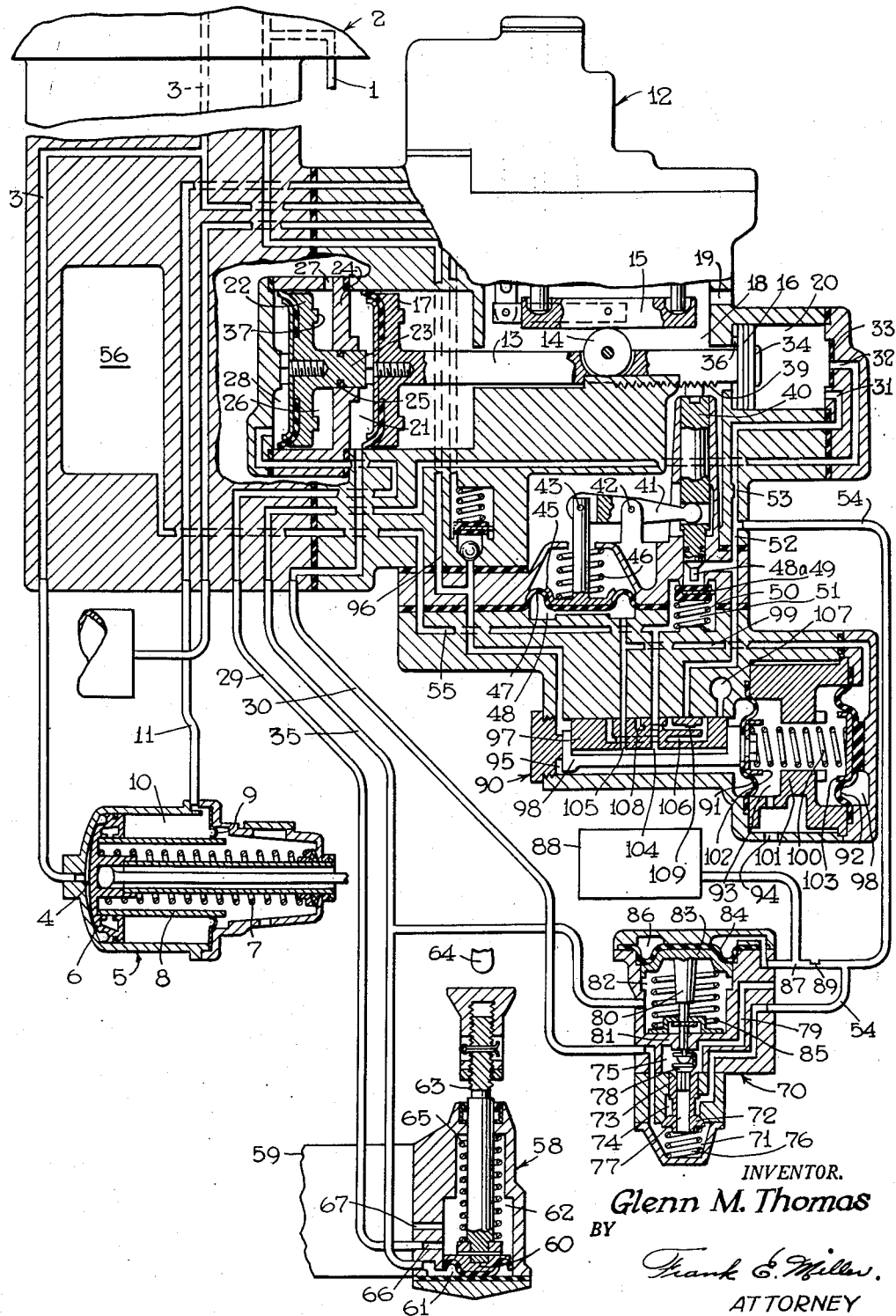
INVENTOR.
Glenn M. Thomas
BY
Frank E. Miller.
ATTORNEY United States Patent Office 2,697,011
Patented Dec. 14, 1954

2,697,011

EMPTY AND LOAD BRAKE EQUIPMENT

Glenn M. Thomas, Dravosburg, Pa., assignor to Westinghouse Air Brake Company, Wilmerding, Pa., a corporation of Pennsylvania Application November 16, 1951, Serial No. 256,777

7 Claims. (Cl. 303—22)

This invention relates to fluid pressure brake apparatus and more particularly to the type for railway vehicles.

In the copending application of Erik G. Erson, Serial No. 255,438, filed November 8, 1951, there is disclosed a brake apparatus for a railway vehicle adapted to provide three different degrees of braking of the vehicle. The degree of vehicle braking is selected by a strut device carried by a sprung portion of the vehicle and adapted to cooperate with an unsprung portion of the vehicle at the time of charging the brake pipe to condition the apparatus according to the deflection of the load carrying springs of the vehicle and hence in accordance with the load on the vehicle. The strut device may be located remote from the apparatus which it controls and three fluid conducting pipes, each subject to possible failure, are connected to the strut device.

The principal object of the invention is the provision of a novel brake apparatus such as above described in which only two pipe connections are required to a strut device thereby reducing the possibility of failure of the apparatus due to pipe failure.

Other objects and advantages will become apparent from the following more detailed description of the invention.

*Description*

The apparatus embodying the invention may be generally like that disclosed in the aforementioned Erson application in view of which only such parts have been shown in the drawing and will be hereinafter described as believed essential to a clear understanding of the invention.

As shown in the drawing, reference numeral 1 designates a brake pipe and reference numeral 2 designates a portion of a brake controlling valve device adapted to operate upon the reduction in pressure in said brake pipe to supply fluid under pressure to a passage 3 and upon restoring pressure of fluid in said brake pipe to release fluid under pressure from said passage.

The passage 3 leads to a pressure chamber 4 in a brake cylinder device 5 which comprises a piston 6 upon which pressure of fluid in said chamber is adapted to act to move said piston in the direction of the right hand for applying the brakes on a vehicle. A release spring 7 acts on piston 6 for moving it back to a brake release position, in which it is shown in the drawing, upon release of fluid under pressure from piston chamber 4 via passage 3 for releasing brakes on the vehicle. Secured at one end to the side of piston 6 opposite pressure chamber 4 is a cylinder 8 the opposite end of which is slidably mounted in the casing in sealing contact with a packing 9; said cylinder cooperating with said piston, said packing and the casing of the brake cylinder device to form a load compensating chamber 10 at the side of piston 6 opposite chamber 4 and which is open by way of a pipe 11 to a control valve device 12.

The control device 12 may, by way of illustration, be like that disclosed in the Erson application above referred to and operate in effecting an application of brakes on an empty vehicle to provide in pipe 11 and the brake cylinder compensating chamber 10 the same pressure as acting in the pressure chamber 4. An application of brakes on an empty vehicle will therefore be limited in degree in accordance with the differential in forces developed by the same pressures of fluid in chambers 4 and 10 acting on the differential areas of the brake cylinder piston 6. When the vehicle is fully loaded the valve device 12 will hold the load compensating chamber 10 open to atmosphere whereby the degree of braking of the fully loaded vehicle will be governed solely by the pressure of fluid in the brake cylinder pressure chamber 4 acting on piston 6. In case of a partially loaded vehicle, such for example as half-loaded, the control valve device 12 will operate to provide fluid in chamber 10 at the time of effecting an application of brakes, equal for example, to one half the pressure of fluid provided in pressure chamber 4 whereby the force developed by piston 6 to apply the brakes will be less than for a fully loaded car but greater than when the vehicle is empty.

The operation of the control valve device 12 to vary pressure of fluid in the compensating chamber 10 in accordance with degree of load on a vehicle, as above described, may be controlled by longitudinal adjustment of a brake control element or rod 13. By way of example, the brake control element 13 may carry a fulcrum roller 14 for a scale beam 15, constituting a part of control device 12, and which roller is adjustable by said element to three different positions relative to said scale beam. When a vehicle is empty the element 13 and fulcrum 14 may occupy the position in which they are shown in the drawing in which said fulcrum engages the beam 15 substantially mid-way between its ends. In case of a fully loaded vehicle the element 13 and fulcrum 14 may be disposed adjacent the right hand end of beam 15, while for a partially loaded vehicle the element 13 will position the roller 14 intermediate its empty and full-load positions. Reference may be made to the above mentioned pending application for the manner in which the valve device 12 operates, as just described, according to the position of the roller 14 relative to the scale beam.

The brake control element 13 is in the form of a rod to one end of which there is connected a piston 16 and to the opposite end a piston 17 of larger diameter than piston 16. The adjacent faces of the two pistons 16 and 17 are open to a chamber 18 containing the element 13, roller 14 and scale beam 15 and which is vented to atmosphere through a port 19. At the opposite face of piston 16 is a pressure chamber 20 while at the opposite side of piston 17 is a pressure chamber 21. A piston 22 arranged in coaxial relation to and of the same size as piston 17 has a rod 23 projecting from one side through a partition wall 24 into chamber 21 for engaging the pressure face of piston 17. A ring seal 25 carried by the rod 23 has sealing and sliding contact with the wall of a bore through partition wall 24 through which the rod 23 extends for preventing leakage of fluid under pressure from chamber 21 to a non-pressure chamber 26 formed between piston 22 and partition wall 24 and which is open to atmosphere through a vent 27. At the opposite side of piston 22 is a pressure chamber 28 open to a pipe 29. Piston chamber 21 is open to a pipe 30 while piston chamber 20 is open to two passages 31 and 32. The passage 32 is open to chamber 20 through a gasket 33 which is provided for engagement by a ring seat 34 around the opening to passage 32. The seat 34 is formed on the adjacent face of piston 16. The passage 31 opens to chamber 20 at a point which will be outside of the ring seat 34 when in contact with gasket 33. The passage 32 leads to a pipe 35.

When fluid under pressure is present in chamber 20, with chambers 21, 28 vented, such pressure acting on piston 16 is adapted to move the brake control element 13 to the position corresponding to an empty vehicle which may be defined by contact between piston 16 and a casing shoulder 36. When fluid under pressure is present in chamber 28 at the same time as chamber 20 is also supplied with fluid pressure, and chamber 21 is vented, the piston 22 being of greater area than piston 16 will move the brake control element 13 to the position for a partially loaded vehicle which may be defined by contact between a stop 37 on piston 22 and partition wall 24. When fluid under pressure is provided in piston chamber 21 at the same time as chamber 20 is charged with fluid under pressure, the piston 17 being of greater area than piston 16 will move the brake control element 13 to the position for a fully loaded car which may be defined by contact between the ring seal 34 and gasket 33 around the opening to passage 32 to close communication between said passage and chamber 20.

The control of fluid under pressure in piston chambers 20, 21 and 28 will be hereinafter described, it being merely desired to explain at this time the selective operation of pistons 16, 17 and 22 by fluid under pressure to adjust the brake control element 13 to its three different positions corresponding to an empty vehicle, a fully loaded vehicle and a partially loaded vehicle, respectively.

The brake control element 13 is provided along one side with a plurality of teeth 39 for engagement by teeth on the end of a plunger 40 slidably mounted in a bore in the casing of the device at right angles to the axis of said element. A lever 41 having one end connected to the plunger 40 is fulcrumed intermediate its ends on a casing carried pin 42 while its opposite end is connected by a pin 43 to a follower 45 against which acts a spring 46 for actuating lever 41 to move said plunger into locking engagement with the control element 13 for holding said element against movement out of an adjusted position. The follower 45 engages one side of a flexible diaphragm 47 at the opposite side of which is a pressure chamber 48. When fluid under pressure is supplied to chamber 48, as will be later described, the diaphragm 47 is adapted to deflect against spring 46 for operating lever 41 to withdraw plunger 40 from locking engagement with the brake control element 13 to permit adjustment of said element. Upon venting of fluid under pressure from chamber 48 the spring 46 is adapted to move the plunger 40 into locking engagement with the brake control element 13, as above described.

The plunger 40 is provided with an extension 48a adapted to contact and unseat a check valve 49 after disengagement of said plunger from the brake control element 13. When the plunger 40 is in contact with the brake control element 13 a spring 50 contained in a chamber 51, which also contains the check valve 49, is adapted to seat said check valve. The check valve 49 controls communication between chamber 50 and a passage 52 which is connected through a choke 53 to passage 31. The passage 52 is also connected to a pipe 54. Chamber 51 is open to a passage 55 leading to a volume reservoir 56.

The reference numeral 58 designates a strut device adapted to be carried by a sprung portion 59 of a vehicle. The strut device comprises a casing containing a vertically movable piston 60 at the lower face of which is a pressure chamber 61 to which the pipe 35 is open. Projecting upwardly from the piston 61 through a chamber 62 at the opposite side of the piston and to the exterior of the casing of the device is a rod 63 the end of which terminates below any suitable unsprung portion 64 of the vehicle. A spring 65 in chamber 62 acts on piston 60 urging it to the position in which it is shown in the drawing. The casing of the strut device further comprises two ports 66 and 67 open to the casing bore in which piston 60 operates so as to be uncovered and opened successively to pressure chamber 61 by piston 60 after a certain movement of said piston from the position in which it is shown in the drawing. The pipe 29 is connected to the port 66 while port 67 leads to atmosphere. With piston 60 in its lowermost position, in which it is shown in the drawing, pipe 29 being open to chamber 62, piston chamber 28 is vented through said chamber and port 67.

With a vehicle empty the strut device 58 will occupy an elevated position with respect to the unsprung portion 64 of the vehicle such that when fluid pressure is supplied to pressure chamber 61, in a manner which will be later described, the piston 60 will move rod 63 into engagement with the unsprung portion 64 of the vehicle before the piston 60 can open port 66 to pressure chamber 61. When the vehicle is partly loaded, such as one-half loaded, for example, the strut device 58 will occupy a lower position relative to the unsprung portion 64 of the vehicle than when the vehicle is empty, under which condition, the rod 63 will not engage the unsprung portion 64 of the vehicle until after piston 60 moves past port 66 and opens same to pressure chamber 61. When the vehicle is fully loaded such movement of piston 60 and rod 63 will be permitted prior to engagement of said rod with the unsprung portion 64 of the vehicle as to open chamber 61 to the atmospheric vent port 67.

Reference numeral 70 designates a full load adjusting device which comprises a casing having a chamber 71 open to pipe 30 and containing a valve 72 which is provided on one end of a plunger 73 slidably mounted in the casing. The plunger 73 extends through a chamber 74 encircling same while the end opposite valve 72 is open to a chamber 75. The valve 72 is arranged to control communication between chamber 71 and chamber 74, which latter chamber is open to pipe 54, and is normally urged to a closed or seated position by a spring 76 contained in chamber 71. The valve 72 and plunger 73 have an axial bore 77 open at one end to chamber 71 and at the opposite end to chamber 75 through a valve seat provided on the end of said plunger for engagement by a valve 78 contained in chamber 75. The valve 78 is provided to control communication between chamber 71 and chamber 75 which latter chamber is open to atmosphere through a passage 79.

The valve 78 is connected to one end of a stem 80 projecting from chamber 75 through a partition wall 81, in sliding contact therewith, into a chamber 82 wherein the opposite end of said stem is provided with a follower 83 engaging one side of a flexible diaphragm 84. A spring 85 in chamber 82 acts on the follower 83 for urging same, the diaphragm 84 and thereby the valve 78 to the position in which these parts are shown in the drawing and in which said valve is unseated from plunger 73 and valve 72 is seated by spring 76. Chamber 82 at one side of the diaphragm 84 is open to pipe 35. At the opposite side of diaphragm 84 there is a control chamber 86 open to a pipe 87 leading to a volume reservoir 88 and also to a choke 89 connecting said pipe to the pipe 54.

The reference numeral 90 designates a cut-off valve device comprising two flexible coaxially arranged and spaced apart flexible diaphragms 91 and 92 between which there is formed a chamber 93 which is open to atmosphere through a vent 94. The diaphragm 92 is of greater diameter than diaphragm 91. At the opposite side of diaphragm 91 is a valve chamber 95 in constant communication with brake pipe 1 through a passage 96 and containing a slide valve 97 which is connected by a stem 98 to the diaphragm 91 for movement therewith. At the opposite side of diaphragm 92 is a chamber 98 which is opened by way of a passage 99 to the latch diaphragm chamber 48 and to the seat of slide valve 97. Passages 55 and 52 also open to the seat of slide valve 97. In chamber 93 there is a spring 100 acting to urge the diaphragms apart and to the positions in which they are shown in the drawing, such position of diaphragm 91 and the slide valve 97 being commonly referred to as the cut-in position and being defined by contact between the diaphragm stem 98 and the casing. Disposed between the two diaphragms 91 and 92 and encircling spring 100 is a stop device 101 arranged for engagement by followers 102 and 103 associated with the diaphragms 91 and 92, respectively, for limiting movement of said diaphragms in the direction of each other. With the diaphragm follower 102 in contact with the stem 101 the slide valve 107 will occupy what is known as a cut-out position.

In operation, let it be assumed that the brake apparatus is void of fluid under pressure. To charge the brake apparatus fluid under pressure will be supplied to brake pipe 1 and thence through passage 96 into chamber 95 of the cut-off valve device 90 and thence through a port 104 in slide valve 97 to passage 55 leading to the check valve chamber 51 and volume reservoir 56 for charging said chamber and reservoir with fluid at the pressure in the brake pipe. At the same time, fluid will flow from valve chamber 95 through a port 105 in slide valve 97 to passage 99 and thence to diaphragm chamber 98 in the cut-off valve device 90 and also to chamber 48 to act on the latching diaphragm 47.

When a sufficient pressure of fluid is thus obtained in chamber 48 to overcome the opposing pressure of spring 46 on diaphragm 47 said diaphragm will deflect against said spring and operate lever 41 to withdraw plunger 40 from locking engagement with the brake control element 13 following which said plunger will unseat the check valve 49. Upon unseating of check valve 49 fluid under pressure now present in the volume reservoir 56 and reinforced by the continued supply from the brake pipe 1 through the port 104 in the cut-off slide valve 97 will flow past said check valve to passage 52 and thence through choke 53 and passage 31 to piston chamber 20. The pressure of fluid thus provided in chamber 20 and acting on piston 16 will then actuate said piston to move the brake control element 13 to its empty position in which it is shown in the drawing, unless already so positioned.

With the adjusting piston 16 in its empty position fluid under pressure supplied through choke 53 to chamber 20 will flow from said chamber through passage 32 and pipe 35 to pressure chamber 61 in the strut device 38, and also to chamber 82 below the diaphragm 84 in the full load adjusting device 70. At the same time as fluid under pressure is supplied through choke 53 to piston chamber 20 fluid will also flow from passage 52 to pipe 54 and thence to chamber 74 in the load adjusting control device 70 and also through choke 89 to pipe 87 and thence to diaphragm chamber 86 in said device and also to the volume reservoir 88. It is desired that the parts of the full load adjusting device 70 remain in the position in which they are shown in the drawing at this time, and the purpose of choke 89 and volume reservoir 88 is to so delay increase in pressure in chamber 86 of said device with respect to increase in pressure in chamber 82 at the opposite side of diaphragm 84 as to enable spring 85 to hold the diaphragm 84 in the position in which it is shown in the drawing with valve 78 open and valve 72 seated. With valve 78 open piston chamber 21 will be open to atmosphere past said valve and the atmospheric passage 79.

When a sufficient pressure of fluid is obtained in piston chamber 61 of the strut device 58, as above described, the piston 60 will move against spring 65 until the end of rod 63 contacts the unsprung portion 64 of the vehicle. If the vehicle is empty so as to prevent piston 60 moving to a position for opening port 66 to pressure chamber 61 then said piston will prevent supply of fluid under pressure to chamber 28 and chamber 21 being open to atmosphere past the open valve 78 in the full load adjusting device 70, the piston 16 will be maintained in contact with stop 36 by pressure of fluid in chamber 20 to hold the brake control element 13 in its empty position.

On the other hand if the vehicle is partially loaded so as to permit piston 60 in the strut device 58 to move past the port 66 fluid under pressure from chamber 61 will flow through said port to pipe 29 and thence into piston chamber 28. The piston 22 being of greater area than piston 16, the pressure of fluid thus obtained in chamber 28 will then move the load control element 19 against the pressure of fluid in chamber 20 acting on piston 16 to its partial load position.

In case the vehicle is fully loaded the strut piston 16 will be moved by pressure of fluid in chamber 61 to a position for opening pipe 35 to atmosphere by way of vent port 67 whereupon a sudden venting of fluid under pressure will occur from chamber 82 in the full load adjusting device 70 as well as from chamber 20, the choke 53 acting at this time to so limit the supply of fluid under pressure to chamber 20 and thereby pipe 35 as to facilitate the sudden reduction in pressure in chamber 82 relative to pressure in chamber 86. Upon such venting of fluid from chamber 82 pressure of fluid in chamber 86 acting on the opposite side of diaphragm 84 will deflect said diaphragm against spring 85 and seat the valve 78 on plunger 73 and then actuate said plunger to open the valve 72. The closing of valve 78 closes communication between chamber 71 and the atmospheric passage 79 while the opening of valve 72 permits supply of fluid under pressure from pipe 54 past valve 72 to chamber 71 and thence through pipe 30 to piston chamber 21. The piston 17 being of greater area than piston 16, the pressure of fluid thus provided in chamber 21 will actuate piston 17 against pressure of fluid in chamber 20 acting on piston 16 to move the brake control element 13 to its full load position. In this full load position of the brake control element 13 the ring seal 34 contacting gasket 33 around the opening to passage 32 will cut off further supply of fluid under pressure to pipe 35 and thereby to diaphragm chamber 82 in the full load adjusting device 70 and to piston chamber 61 in the strut device 58 whereby when the pressure of fluid in chamber 61 becomes sufficiently reduced through the atmospheric vent 67, spring 65 will return the piston 60 toward its normal position in which it is shown in the drawing.

While the above adjustment of the brake control element 13 is taking place the pressure of fluid in brake pipe 1 and thereby in valve chamber 95 of the cut-off valve device 90 will be gradually increasing. This increase in pressure in chamber 95 will also be reflected through port 105 in slide valve 97, in passage 99 and diaphragm chamber 98 of the cut-off valve device. As the pressure of fluid in chamber 98 is thus increased the diaphragm 92 will be gradually deflected toward the left hand for increasing the pressure of spring 100 against the diaphragm 102 according to the increase in brake pipe pressure in chamber 95 on diaphragm 102 to thereby hold the latter diaphragm against movement out of its cut-in position by increasing pressure of fluid in valve chamber 95. Deflection of diaphragm 92 will finally be stopped by contact between follower 103 and the casing stop 101. As pressure in brake pipe 1 and in valve chamber 95 is then further increased the diaphragm 91 will move against the spring 100 until finally stopped by contact between follower 102 and casing stop 101. In this position of diaphragm 91 the slide valve 97 will occupy a so called cut-out position.

In this cut-out position of slide valve 97 a passage 106 in said slide valve will connect the casing passage 99 to an atmospheric passage 107 for venting fluid under pressure from the latch diaphragm chamber 48 and also from chamber 98 at one side of the diaphragm 92. When the pressure of fluid in chamber 48 is thus sufficiently reduced spring 46 will return the follower 45 and diaphragm 47 to their normal position, in which they are shown in the drawing, and at the same time through lever 41 will actuate plunger 40 into locking engagement with the brake control element 13. The venting of fluid under pressure from diaphragm chamber 98 in the cut-out valve device will permit extension of spring 101 by movement of diaphragm 92 to the position in which it is shown in the drawing. This extension of spring 100 will reduce its pressure on diaphragm 91 in order to insure that said diaphragm and slide valve 97 would not be returned to their cut-in position by said spring until the brake pipe pressure is subsequently reduced to a relatively low degree, such as ten pounds.

Also in the cut-out position of the cut-out slide valve 97, a passage 108 therein, which is open through a choke 109 to the vented passage 106, registers with passages 55 and 52 whereby fluid under pressure will be released from the volume reservoir 56 and check valve chamber 51 and also from passage 52.

If the brake control element 13 is in either empty or partial load position with the ring seat 34 out of contact with gasket 33, the venting of fluid under pressure from passage 52 through the cut-out slide valve 97 will result in venting of chamber 20 and through passage 32 and pipe 35 of strut piston chamber 61 and diaphragm chamber 82 in the full load adjusting device 70. Upon such venting of fluid from the strut piston chamber 61 return of piston 60 to its normal position by spring 65 will promptly occur. However, if the ring seat 34 is in contact with gasket 33, as in the full load position of the brake control element 13, any pressure which remains in the strut piston chamber 61 and diaphragm chamber 82 of the control device 70 at the time of venting passage 32 will be dissipated to atmosphere by leakage past the strut piston 60.

Upon venting of fluid under pressure from passage 52 through the cut-off slide valve 97, as above mentioned, fluid under pressure will also be released from pipe 54 and thereby from diaphragm chamber 86 in the full load adjusting device 70 and from volume reservoir 88. With the fluid under pressure thus released from chamber 86 and also from chamber 82 in the full load adjusting device 70 the parts of said device will be returned to the position in which they are shown in the drawing by spring 85. With the valve 72 thus seated and valve 78 open, pipe 30 and chamber 21 will be vented to atmosphere past the latter valve. Such release of fluid under pressure from chamber 20 and chamber 28 or chamber 21 will however be delayed by choke 109 with respect to release of fluid under pressure from the latch diaphragm chamber 48 in order to insure that the plunger 40 moves into locking engagement with the brake control element 13 to hold it in its adjusted position before the fluid pressure is released from the chambers 20, 28 or 21.

With the brake control element 13 thus adjusted in accordance with the loaded condition of the car during charging of the brake pipe 1, when an application of brakes is subsequently effected, the degree of such application will be limited in accordance with such adjustment.

Summary

It will now be seen that I have provided a relatively simple and positively operating apparatus for selectively positioning a brake control element to any one of three different positions, corresponding to different degrees of load on the vehicle, requiring only two pipes to a strut device which is operative upon initial charging of the brake apparatus to control the positioning of said element in accordance with the load on the vehicle.

Having now described my invention, what I claim as new and desire to secure by Letters Patent, is:

1. In a brake control apparatus for a vehicle having an unsprung part and a load carrying sprung part spaced from said unsprung part a distance proportional to the degree of said load, in combination, a brake control element adjustable to different positions corresponding to different degrees of load on the vehicle, movable abutment means controlled by opposing pressures of fluid in two chambers and operable upon a variation in pressure in one of said chambers relative to the pressure in the other to effect movement of said element from one position of adjustment to another, a strut device carried by one of said vehicle parts and movable by fluid under pressure into contact with the other part and hence a distance proportionate to the load on the vehicle, a brake pipe, a first valve means operable upon charging of said brake pipe with fluid under pressure to supply fluid under pressure to said other chamber and to said strut device, a second valve means for effecting said variation in pressure in said one chamber, said strut device comprising means for effecting said operation of said second valve means upon operation of said strut device for one chosen degree of load on the vehicle, and means operable by said abutment means upon response to said variation in pressure in said one chamber to cut off supply of fluid under pressure from said first valve means to said strut device.

2. In a brake control apparatus for a vehicle having sprung and unsprung parts, in combination, a brake control element adjustable to different positions corresponding to different degrees of load on the vehicle, a first movable abutment operable upon supply of fluid under pressure to one chamber to move said element to one of said positions, a second movable abutment operable upon supply of fluid under pressure to another chamber to move said element to a second one of said positions, a strut device carried by one of said parts and including piston means movable by fluid under pressure a distance which varies according to load on the vehicle, into engagement with the other part, valve means comprising movable abutment means operative upon substantial equalization of pressures in two chambers to vent said other chamber and upon release of fluid under pressure from one of said two chambers to supply fluid under pressure to said other chamber, a brake pipe, other valve means operative upon charging said brake pipe with fluid under pressure to supply fluid under pressure to said one chamber, to said strut device to operate said piston and also to both of said two chambers, and means controlled by said piston means for venting said one of said two chambers only upon a chosen degree of movement of said piston means by fluid under pressure.

3. In a brake control apparatus for a vehicle having sprung and unsprung parts, in combination, a brake control element adjustable to different positions corresponding to different degrees of load on the vehicle, a first movable abutment operable upon supply of fluid under pressure to one chamber to move said element to one of said positions, a second movable abutment operable upon supply of fluid under pressure to another chamber to move said element to a second one of said positions, a strut device carried by one of said parts and including piston means movable by fluid under pressure a distance which varies according to load on the vehicle, into engagement with the other part, valve means comprising movable abutment means operative upon substantial equalization of pressures in two chambers to vent said other chamber and upon release of fluid under pressure from one of said two chambers to supply fluid under pressure from one of said two chambers to supply fluid under pressure to said other chamber, a brake pipe, a choke, other valve means operative upon charging of said brake pipe with fluid under pressure to supply fluid under pressure to the other of said two chambers at one rate and to said first chamber, said strut device and the other of said two chambers through said choke at a slower rate, and means controlled by said piston means for venting said one of said two chambers only upon a chosen degree of movement of said piston means by fluid under pressure.

4. In a brake control apparatus for a vehicle having sprung and unsprung parts, in combination, a brake control element adjustable to different positions corresponding to different degrees of load on the vehicle, a first movable abutment operable upon supply of fluid under pressure to one chamber to move said element to one of said positions, a second movable abutment operable upon supply of fluid under pressure to another chamber to move said element to a second one of said positions, a strut device carried by one of said parts and including piston means movable by fluid under pressure a distance which varies according to load on the vehicle, into engagement with the other part, valve means comprising movable abutment means operative upon substantial equalization of pressures in two chambers to vent said other chamber and upon release of fluid under pressure from one of said two chambers to supply fluid under pressure to said other chamber, a brake pipe, other valve means operative upon charging said brake pipe with fluid under pressure to supply fluid under pressure to said one chamber, to said strut device to operate said piston and also to both of said two chambers, means controlled by said piston means for venting said one of said two chambers only upon a chosen degree of movement of said piston means by fluid under pressure, and means operable by said first movable abutment upon movement of said brake control element to its second position to cut-off supply of fluid under pressure from the first named valve means to said strut means and the said one of said two chambers.

5. In a brake control apparatus for a vehicle having unsprung and load carrying sprung parts, in combination, a brake control element having three different positions of adjustment corresponding, respectively, to an empty vehicle, a partial load on the vehicle and a full load on the vehicle, a first movable abutment operable by fluid under pressure in a first chamber to move said element to said empty position, second and third movable abutments operable by fluid under pressure in second and third chambers to move said element to said partial and full load positions, respectively, against pressure of fluid acting on said first abutment, valve means controlled by opposing pressures of fluid in two chambers and operative upon substantial equalization of such pressures to open a vent from said third chamber and operable by pressure of fluid in one of said two chambers upon venting of fluid under pressure from the other of said two chambers to establish a fluid pressure supply communication to said third chamber, a first pipe open to said other of said two chambers, another pipe connected to said second chamber, a strut device carried by one of said vehicle parts comprising piston means operable by fluid under pressure in a chamber open to said first pipe into contact with the other vehicle part for opening the last named chamber to said other pipe with a partially loaded vehicle and to atmosphere with a fully loaded vehicle and for closing communication between the last named chamber and said other pipe and atmosphere with an empty vehicle, a brake pipe, and control valve means operative upon charging of said brake pipe with fluid under pressure to supply fluid under pressure to said first chamber, to said first pipe and to the other of said two chambers.

6. In a brake control apparatus for a vehicle having unsprung and load carrying sprung parts, in combination, a brake control element having three different positions of adjustment corresponding, respectively, to an empty vehicle, a partial load on the vehicle and a full load on the vehicle, a first movable abutment operable by fluid under pressure in a first chamber to move said element to said empty position, second and third movable abutments operable by fluid under pressure in second and third chambers to move said element to said partial and full load positions, respectively, against pressure of fluid acting on said first abutment, valve means controlled by opposing pressures of fluid in two chambers and operative upon substantial equalization of such pressures to open a vent from said third chamber and operable by pressure of fluid in one of said two chambers upon venting of fluid under pressure from the other of said two chambers to establish a fluid pressure supply communication to said third chamber, a first pipe open to said other of said two chambers, another pipe connected to said second chamber, a strut device carried by one of said vehicle parts comprising piston means operable by fluid under pressure in a chamber open to said first pipe into contact with the other vehicle part for opening the last named chamber to said other pipe with a partially loaded vehicle and to atmosphere with a fully loaded vehicle and for closing communication between the last named chamber and said other pipe and atmosphere with an empty vehicle, latch means for said element operable by fluid under pressure to release said element for movement, a brake pipe, valve means operative during charging of said brake pipe to a chosen degree to supply fluid under pressure to said latch means, means operative by unlatching operation of said latch means to supply fluid under pressure to said first pipe and to the other of said two chambers, the last named valve means being also operative in response to a chosen greater pressure of fluid in said brake pipe to vent fluid under pressure from said latch means, said first pipe and said other of said two chambers, and choke means for restricting such venting of fluid under pressure from said pipe and said other of said two chambers with respect to the venting of fluid under pressure from said latch means.

7. In a brake control apparatus for a vehicle having unsprung and load carrying sprung parts, in combination, a brake control element having three different positions of adjustment corresponding, respectively, to an empty vehicle, a partial load on the vehicle and a full load on the vehicle, a first movable abutment operable by fluid under pressure in a first chamber to move said element to said empty position, second and third movable abutments operable by fluid under pressure in second and third chambers to move said element to said partial and full load positions, respectively, against pressure of fluid acting on said first abutment, valve means controlled by opposing pressures of fluid in two chambers and operative upon substantial equalization of such pressures to open a vent from said third chamber and operable by pressure of fluid in one of said two chambers upon venting of fluid under pressure from the other of said two chambers to establish a fluid pressure supply communication to said third chamber, a first pipe open to said other of said two chambers, another pipe connected to said second chamber, a strut device carried by one of said vehicle parts comprising piston means operable by fluid under pressure in a chamber open to said first pipe into contact with the other vehicle part for opening the last named chamber to said other pipe with a partially loaded vehicle and to atmosphere with a fully loaded vehicle and for closing communication between the last named chamber and said other pipe and atmosphere with an empty vehicle, a brake pipe, control valve means operative upon charging of said brake pipe with fluid under pressure to supply fluid under pressure to said first chamber, to said first pipe and to the other of said two chambers, and valve means operable by said first abutment upon positioning of said element by said third abutment to close communication between said control valve means and said first pipe.

References Cited in the file of this patent
UNITED STATES PATENTS

| Number | Name | Date |
|---|---|---|
| 2,344,868 | Hewitt(A) | Mar. 21, 1944 |
| 2,447,857 | Hewitt(B) | Aug. 24, 1948 |
| 2,534,622 | Pickert | Dec. 19, 1950 |